United States Patent [19]

Sitsen et al.

[11] 4,145,096
[45] Mar. 20, 1979

[54] DUAL PIVOTING PANEL CLOSURE

[75] Inventors: Heinz Sitsen, Krefeld-Fischeln; Otto Goppold, Krefeld, both of Fed. Rep. of Germany

[73] Assignee: U.S. Philips Corporation, New York, N.Y.

[21] Appl. No.: 835,042

[22] Filed: Sep. 21, 1977

[30] Foreign Application Priority Data

Sep. 22, 1976 [DE] Fed. Rep. of Germany ....... 2642508

[51] Int. Cl.² ............................................. A47B 81/06
[52] U.S. Cl. ................................. 312/7 TV; 312/27; 312/208; 312/322
[58] Field of Search ............. 312/7 TV, 7 R, 27, 208, 312/320, 322, 323

[56] References Cited

U.S. PATENT DOCUMENTS

| 1,137,261 | 4/1915 | Dyke | 312/27 |
| 1,307,261 | 6/1919 | Lee | 312/27 |
| 1,873,522 | 8/1932 | Abbott et al. | 312/322 |
| 2,522,467 | 9/1950 | Shea | 312/7 R |
| 2,676,077 | 4/1954 | McMahan | 312/27 |
| 2,849,984 | 9/1958 | Eisenmenger | 312/208 |
| 2,919,966 | 1/1960 | Preston | 312/27 |
| 3,294,906 | 12/1966 | Swanson | 312/7 TV |

Primary Examiner—Victor N. Sakran
Attorney, Agent, or Firm—David R. Treacy

[57] ABSTRACT

A device closed by a panel which is sequentially pivotable in opposite directions about two parallel transverse pivots, one of the pivots being slidable outwardly in a plane which extends parallel to the other pivot. The device is particularly suitable for use as a tuning circuit holder in television sets.

8 Claims, 3 Drawing Figures

U.S. Patent     Mar. 20, 1979     4,145,096
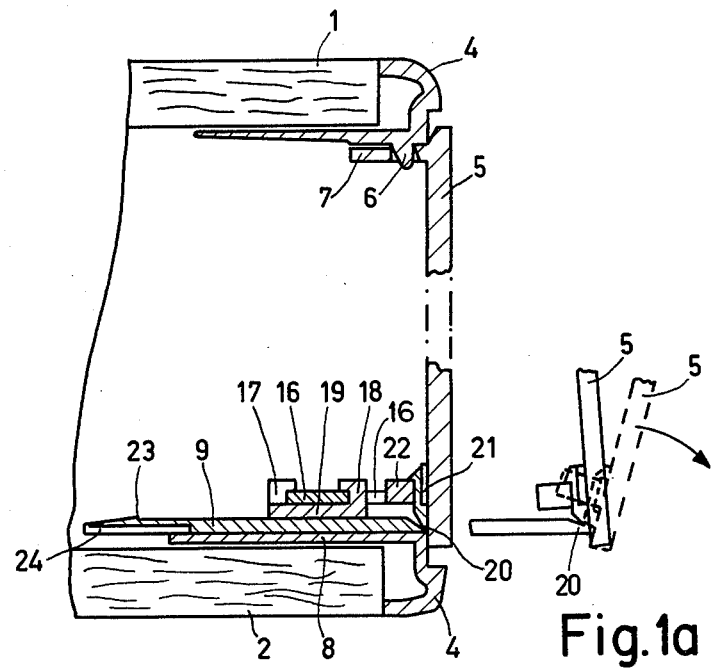
Fig.1
Fig.1a
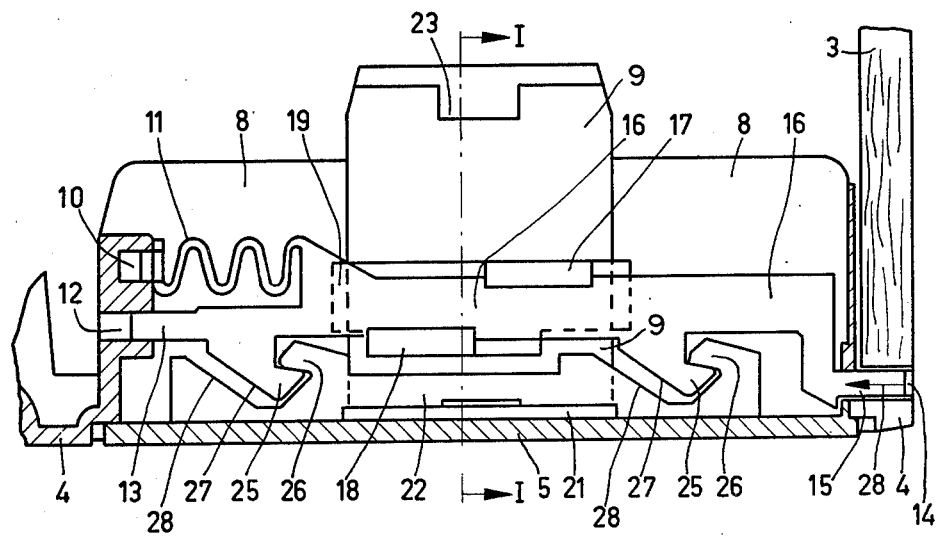
Fig.2

DUAL PIVOTING PANEL CLOSURE

BACKGROUND OF THE INVENTION

The invention relates to a device or holder which encloses space between a lower face and a parallel upper face, and has a panel which closes at least part of the space between the lower face and the upper face and which is pivotable about a first pivot which is parallel to the two faces.

Devices of this type are used on the front of television sets, for example, to accommodate control means such as tuning devices. A holder of this kind may form part of a frame in which the television tube is mounted. The tuning devices are often mounted on the pivotable panel itself.

To provide accessibility of the tuning means in the holder during the manufacture of television sets, it is not desirable for the panel to be locked in the operating position. On the other hand, damaging of the panel due to excessive projection beyond the front face of the frame is to be prevented. The operating position of the panel is to be understood to mean herein the closed position in which the locked panel is situated in the front plane of the frame. Furthermore, it must be possible to unlock a panel which is in the closed position, to permit adjustment, repair and maintenance of the tuning means, without ugly grips or apertures being required in the front of the television set.

In a holder this type which is known from U.S. Pat. No. 3,294,906, the panel is pivoted outwardly in the forwards direction by means of a grip. The panel has two stable positions and is maintained in these positions by two springs. The position in which the panel has been pivoted forwards involves the risk of the panel as well as the tuning means provided thereon being damaged during the manufacture of television sets. Moreover, there is also a risk that the forwards projecting panel is very quickly swung back by a jolt, so that the risk of damage is comparatively high.

SUMMARY OF THE INVENTION

The object of the invention is to provide a pivoting panel closure which precludes damaging of the device as far as possible during manufacture as well as during use, but which offers optimum accessibility of the space enclosed by the panel.

In accordance with the invention a panel assembly is pivotable in an opposite direction about a second pivot in a member which is slidable outwardly, perpendicular to the pivot axis, which extends parallel to the first pivot, and which is slidable in a plane which is parallel to the lower face of the device and the first pivot axis.

The invention will be described in detail hereinafter with reference to the drawing.

BRIEF DESCRIPTION OF THE DRAWING

FIG. 1 is a view of a vertical section, taken along the line I—I in FIG. 2, of a preferred embodiment of a device with pivoted panel in accordance with the invention, FIG. 1a is a partial side elevation of the panel partly opened, and being pivoted in a second direction, and FIG. 2 is a view of a horizontal section of the device shown in FIG. 1.

DESCRIPTION OF THE PREFERRED EMBODIMENT

The device or holder shown in the FIGS. 1 and 2 is integrated in the cabinet of, for example, a television set having an upper plate (face) 1 and a lower plate (face) 2 which is parallel thereto. A sidewall 3 extends vertically between and is connected to the plates 1 and 2 on both sides (for the sake of simplicity, only one side is shown in FIG. 2). A frame 4 is secured at the end faces of the plates 1 and 2 and the side wall 3, the frame forming a window (not shown) for the television picture tube and a further window which is closed by a panel 5. On the inner side of the panel 5 tuning means may be mounted. These tuning means, however, can alternatively be accommodated in the internal space bounded by the plates 1 and 2, the sidewall 3 and the panel 5. The frame 4 includes one or more pins 6 which engage in mating apertures or eyelets 7 formed on the panel 5, the pins being shaped so that the panel can pivot about them.

A retaining element 22 is secured to the interior of the panel 5, a front portion 21 of a strip-shaped supporting member 9 made of a flexible synthetic material being hooked behind the retaining element. The supporting member 9 has a so-called integral hinge 20 formed in it, defining a pivot axis parallel to the pivot formed by the pins 6, and interconnecting the front portion 21 with the central part of the member 9. A thin portion 24 and a barbed stop 23 project from the rear of the central part. A bridge 19 is mounted on a portion 8 of the frame 4 and extends parallel to the pivot axes and the lower face 2 over the central part strip-shaped supporting member 9. The bridge 19 thus forms a sliding guide for the supporting member 9 and serves as an abutment for the stop 23.

The bridge 19 also serves as a sliding guide for a transverse latch element 16. For this purpose the bridge 19 has two portions 17 and 18 which extend transversely along the rear and front edges of the latch 16 and overhang the top surface of the latch to retain it. The latch 16 is made of a synthetic material and has a resilient portion formed as a reset spring 11 whose remote end is located in a socket 10 of the frame 4. The latch 16 has projecting pin-shaped ends 13 and 15 which are guided in transverse bores 12 and 14 to either side in the frame 4, and two identical forwardly and transversely extending latching projections 25 which engage hooks 26 on the retaining element 22 to lock the panel 5 closed. At their sides away from the hooks 26 the projections 25 have oblique panel-opening faces 27 which engage, during the unlocking of the panel 5, matching oblique faces 28 formed on the retaining element 22. The panel 5 can be unlocked by pressing against the end 15 of the latch 16 in the direction of the arrow 28 (FIG. 2) with a pin-shaped tool, to move the projections 25 out of engagement with the hooks 26.

The spring 11 is then compressed, so that the latch slides to the left in the bridge 19 until the oblique faces 27 and 28 of the latch 16 and the positioning member 22, respectively, engage each other. The panel assembly including the panel 5, retaining element 22 and portion 21 of the member 9 then starts to pivot in a first angular direction (counterclockwise as viewed in FIG. 1) about the pivot axis formed by the pins 6 as the sliding progresses further. During the outwards pivoting of the panel 5 (toward the intermediate position denoted by solid lines in FIG. 1a, the central part of the member 9 moves outward under the bridge 19 (to the right as viewed in FIG. 1). During the manufacture of television sets, the panel 5 is pivoted outwards only so far that the hand can just grip around the panel. The pins 6 still engage the eyelets 7 in this position. The pivoting angle associated with this position is obtained by the sliding of the latch 16 only. In this position, the panel projects so far (1-1.5 cm) from the contour of the apparatus that only a comparatively small risk of damage exists. The forward edges of the projections 25 engage the rear of the hooks 26 on the positioning member 22 to prevent the latch from returning to the operating position.

If desired, the panel 5 can be pivoted further outwards by hand in the same direction, for example, in preparation for adjusting the tuning means situated behind the panel. The upper side of the panel must then be retained by hand, because at an intermediate position the eyelets 7 will move downward off the pins 6, releasing the top edge of the panel 5. At maximum normal outward movement of the supporting member 9, the stop 23 on the supporting member 9 abuts the bridge 19. From the intermediate position, the panel can be pivoted about the hinge 20 in the opposite direction shown by the arrow in FIG. 1a, so that the panel and all components accommodated in the holder or on the panel will be readily accessible. If desired, the entire panel can be removed from the apparatus by exerting a slight pressure on the supporting member 9 at the area of the thin portion 24. The downwards bent stop 23 can thus be slid underneath the bridge 19.

Even though the invention has been described with reference to a device in which the latch is located in the vertical direction by the portions 17 and 18 of the bridge 19, it is alternatively possible to locate the latch by means of the supporting member 9 which is in that case situated above the latch. The supporting member 9 is then located in the bridge in the vertical direction. This can be realized in various ways. It is alternatively possible to provide the supporting member 9 with a resilient lug which can abut against the front edge (right side as viewed in FIG. 1) of the bridge 19. In the case of jolting of a slightly pivoted outwards panel (1-1.5 cm), a lug of this kind prevents the panel from being pivoted inwards so far that it becomes difficult to pivot it further outwards by hand.

Finally, it is to be noted that the use of the device in accordance with the invention is by no means restricted to television sets. The device can be used whenever a high degree of accessibility of parts accommodated in it is required.

What is claimed is:

1. A device with an improved pivoting panel closure, said device having an internal space bounded by first and second spaced frame faces, and a panel assembly including a panel closing at least part of an area between said faces, wherein said device comprises first pivot means defining a first pivot axis adjacent said second face, formed by means releasably connecting said panel to the frame, said connecting means comprising at least one projecting element engaging at least one respective aperture, said assembly includes a pivot member connected to the panel and having second pivot means, said device including means for mounting the member for sliding motion in an outward direction transverse to said first pivot axis, said pivot member being arranged such that in a closed position said panel is pivotable in a first angular direction about said first pivot axis toward an intermediate position while said pivot member slides outward, said assembly is arranged such that in said intermediate position said panel is pivotable about a second pivot axis defined by said pivot means and parallel to said first pivot axis, in a second angular direction opposite said first angular direction without further sliding movement of the pivot member, and said device additionally comprising latching means for holding said panel in a closed position, said latching means including a latching element having a latching projection and a panel-opening surface, means for guiding said latching element for movement between first and second positions, and means cooperating with said latching projection for locking said panel in a closed position when said latching element is in the first position; and means engaging said panel-opening surface upon movement of the latching element from the first to second position while the panel is closed for pivoting said panel about said first pivot axis to an at least partially open position.

2. A device as claimed in claim 1 wherein said means for guiding comprises a bridge member having guiding parts engaging said latching element for relative sliding movement in a direction parallel said axes, said bridge member having additional surfaces retaining and guiding said pivot member for said slidable motion in the outward direction.

3. A device as claimed in claim 2, wherein said pivot member has a stop surface arranged to engage said bridge member upon outward movement of the pivot member at least to a position corresponding to the panel intermediate position, and the device includes resilient means for enabling relative movement between the stop surface and the bridge member so that the pivot member may be withdrawn outwardly from the device to permit complete removal of the panel asembly.

4. A device with an improved pivoting panel closure, said device having an internal space bounded by first and second spaced frame faces, and a panel assembly including a panel closing at least part of an area between said faces, wherein said device comprises first pivot means defining a first transverse pivot axis adjacent said second face, said assembly includes a pivot member having a portion connected to the panel, a central part, and a second pivot means pivotally connecting said portion and said part about a second pivot axis parallel to said first pivot axis, and said device also comprises means for releasably retaining and guiding the central part of the pivot member with respect to the frame for sliding motion in an outward direction generally perpendicular to said axes, said pivot member being arranged such that in a closed position said panel is pivotable in a first angular direction about said first pivot axis toward an intermediate position while said central part slides outward; and means for locking said panel assembly in the closed position, and moving said panel to a partially open position and blocking it in the partially open position;

said means for locking, moving and blocking comprising a latching element having a latching surface, a panel-opening surface and a blocking surface; means for guiding said latching element between first and second positions; means cooperating with said latching surface for locking said panel in a closed position when said latching element is in the first position; means engaging said panel-opening surface upon movement of the latching element from the first to the second position while the panel is closed for pivoting said panel about the first axis to a partially open position; means engaging said blocking surface when the latching element is in the first position and the panel is in said partially open position for preventing movement of the panel to the closed position; and means for biasing said latching element from said second position toward said first position;

said first pivot means comprises at least one projecting element and respective mating element releasably and pivotally connecting said panel to the frame such that, as said panel moves toward said intermediate position the panel also moves away from said second face and is released from the first pivotal connection to the frame, and said assembly is arranged such that in said intermediate position said panel is pivotable about said second pivot axis in a second angular direction opposite said first angular direction, without sliding movement of said central part.

5. A device as claimed in claim 4, wherein said partially open position is between said closed and said intermediate positions, in the partially open position said panel being prevented from pivoting without corresponding movement of said central part, by the connection of the first pivot means between the frame and the panel; and in said partially open position said panel is exposed for manual gripping sufficient to pivot the panel assembly further in the first angular direction to the intermediate position.

6. A device as claimed in claim 5 wherein said latching element is slidably mounted in the frame, said latching element having an end disposed in a through hole in the frame, when said latching element is in the first position said end being recessed below an exterior frame surface, so arranged that by depressing said end with a tool inserted in the hole said latching element is moved from the first to the second positions.

7. A device as claimed in claim 4 wherein said means for retaining and guiding the central part, and said means for guiding said latching element, are formed as different surfaces of a bridge member fastened to the frame, the central part sliding between the bridge member and the frame.

8. A device as claimed in claim 4 wherein said pivot member portion is connected to the panel by a retaining element fastened to the panel; said means cooperating with the latching surface and said means engaging said blocking surface are opposite surfaces of a hook projecting from the retaining element; and said means engaging said panel-opening surface is a surface formed on said retaining element.

* * * * *